United States Patent
Levy et al.

(10) Patent No.: US 12,065,369 B2
(45) Date of Patent: Aug. 20, 2024

(54) ORGANIC WASTE TREATMENT PROCESS

(71) Applicant: Paulee Cleantec Ltd., Tel Aviv (IL)

(72) Inventors: Ilan Levy, Kfar Harif (IL); Oded Halperin, Bazra (IL)

(73) Assignee: Paulee Cleantec Ltd., Tel Aviv (IL)

( * ) Notice: Subject to any disclaimer, the term of this patent is extended or adjusted under 35 U.S.C. 154(b) by 423 days.

(21) Appl. No.: 17/430,017

(22) PCT Filed: Feb. 11, 2020

(86) PCT No.: PCT/IB2020/051085
§ 371 (c)(1),
(2) Date: Aug. 11, 2021

(87) PCT Pub. No.: WO2020/165765
PCT Pub. Date: Aug. 20, 2020

(65) Prior Publication Data
US 2022/0112109 A1 Apr. 14, 2022

Related U.S. Application Data

(60) Provisional application No. 62/804,331, filed on Feb. 12, 2019.

(51) Int. Cl.
*C02F 9/00* (2023.01)
*C02F 1/00* (2023.01)
(Continued)

(52) U.S. Cl.
CPC .......... *C02F 9/00* (2013.01); *C02F 2001/007* (2013.01); *C02F 1/56* (2013.01);
(Continued)

(58) Field of Classification Search
CPC .... C02F 9/00; C02F 1/56; C02F 11/06; C02F 11/12; C02F 2001/007; C02F 2103/20;
(Continued)

(56) References Cited

U.S. PATENT DOCUMENTS

| 4,765,900 A | * | 8/1988 | Schwoyer | ................ C02F 9/00 210/603 |
| 9,936,842 B2 | | 4/2018 | Shoseyov et al. | |

(Continued)

FOREIGN PATENT DOCUMENTS

| CN | 107628737 | 1/2018 |
| CN | 108892355 | 11/2018 |

(Continued)

OTHER PUBLICATIONS

PCT Search Report and Written Opinion PCT/IB2020/051085, May 27, 2020.

*Primary Examiner* — Waqaas Ali
(74) *Attorney, Agent, or Firm* — Dekel Patent Ltd.; David Klein

(57) ABSTRACT

A method of organic waste treatment includes treating an organic waste stream that contains solid waste particles suspended in a liquid to cause the solid waste particles to settle in a settling tank, separating contents of the tank into a separated liquid phase and a separated solid phase, and treating the separated solid phase with an oxidant to create a sterile odorless ash.

5 Claims, 2 Drawing Sheets

(51) Int. Cl.
    *C02F 1/56*     (2023.01)
    *C02F 11/06*     (2006.01)
    *C02F 11/12*     (2019.01)
    *C02F 103/20*     (2006.01)
    *C02F 103/22*     (2006.01)

(52) U.S. Cl.
    CPC ............... *C02F 11/06* (2013.01); *C02F 11/12* (2013.01); *C02F 2103/20* (2013.01); *C02F 2103/22* (2013.01); *C02F 2303/02* (2013.01)

(58) Field of Classification Search
    CPC .............. C02F 2103/22; C02F 2303/02; C02F 11/147
    See application file for complete search history.

(56) References Cited

U.S. PATENT DOCUMENTS

| | | | |
|---|---|---|---|
| 2012/0080383 A1* | 4/2012 | Kesler | C02F 11/08 210/721 |
| 2014/0034573 A1* | 2/2014 | Liu | C02F 3/1221 210/603 |
| 2015/0336022 A1 | 11/2015 | Topping | |
| 2016/0367090 A1* | 12/2016 | Shoseyov | A47K 11/023 |

FOREIGN PATENT DOCUMENTS

| | | |
|---|---|---|
| JP | S574287 | 1/1982 |
| WO | 2008/037429 | 4/2008 |
| WO | 2017/006343 | 1/2017 |

* cited by examiner

ORGANIC WASTE TREATMENT PROCESS

FIELD OF THE INVENTION

The present invention relates to methods for treating organic waste such as sewage sludge or animal exudates.

BACKGROUND OF THE INVENTION

There are many methods for treating organic waste. For example, in waste sludge dewatering, waste sludge may be treated to obtain a dry product. The dry product may provide a substantial reduction in storage volume, facilitate transportation, and reduce energy in instances where incineration of the product is performed. Chemical conditioning may be utilized to facilitate dewatering of waste sludge. The conditioning may cause the flocculation of suspended particulates in the waste sludge.

A typical prior art process is shown in FIG. 1. A wastewater stream is separated into a solids rich portion and a solids lean portion by way of a solids separation step (101). The separation step 101 may result in the solids rich portion containing a high percentage (e.g., 70% or more) of the total suspended solids (TSS) from the wastewater. Total suspended solids (TSS) are a water quality parameter that is defined as the quantity of material suspended in a known volume of water that is trappable in a filter.

The solids rich portion is then treated in an anaerobic digester (step 102); alternatively, aerobic decomposition may be used. The anaerobic or aerobic process enhances microbial activity to treat the organic material.

The slurry is then mixed in step 103 with flocculating reagents to capture all solids including the TSS to form flocs that afterwards can be filtered out using different methods. Accordingly, in step 104, a settling or filtering method is used to separate the water from the solids.

After filtering, in step 105, products of the filtering are obtained, namely, cleaner water and sludge. The cleaner water may be further filtered (e.g., with a sand filter or active carbon filter (step 106). This provides reclaimed water good for toilet flushing and field irrigation or environmental discharge.

A problem of the prior art is the step 102 of anaerobic or aerobic decomposition is very expensive and time-consuming.

SUMMARY OF THE INVENTION

The present invention seeks to provide a novel organic waste treatment process, as described in detail below. The present invention eliminates the step of anaerobic or aerobic decomposition, thereby realizing a significant savings in energy and time.

One of the significant differences between the present invention and the prior art is the following. In the prior art, (a) the solid portion of the waste is usually separated from the liquid portion before anaerobic or aerobic decomposition can be carried out, and (b) flocculation must be carried out after decomposition. If flocculation were carried out before decomposition, the decomposition would take much longer and would not be cost effective. In contrast, in the present invention, (a) anaerobic or aerobic decomposition is eliminated and (b) flocculation (or sedimentation) is carried out before oxidation. The oxidation is efficient after flocculation or sedimentation.

There is thus provided in accordance with an embodiment of the present invention a method of organic waste treatment including treating an organic waste stream that contains solid waste particles suspended in a liquid to cause the solid waste particles to settle in a settling tank, separating contents of the tank into a separated liquid phase and a separated solid phase, and treating the separated solid phase with an oxidant to create a sterile odorless ash.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
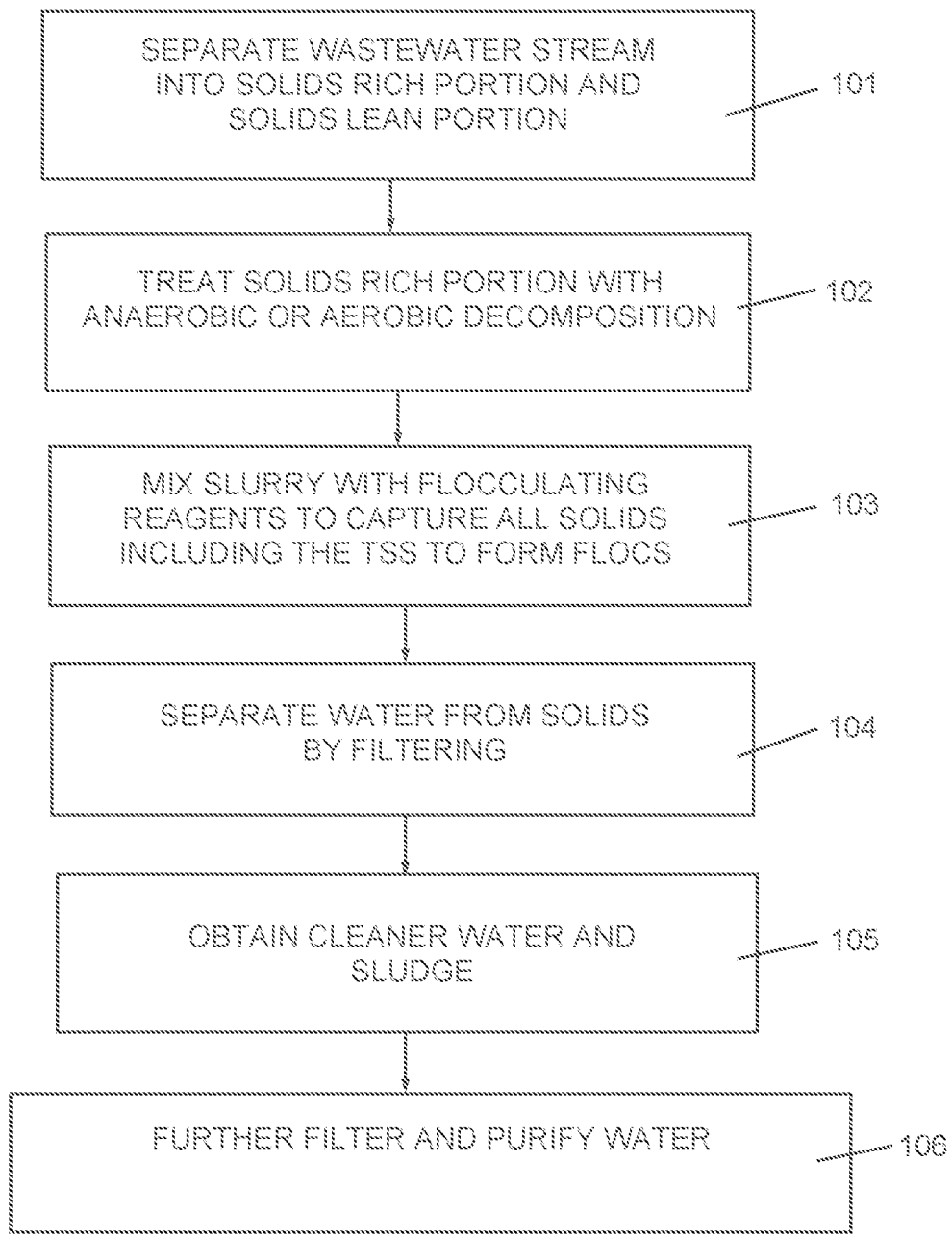
FIG. 1 is a flow chart of a prior art organic waste treatment process.
Figure 2:
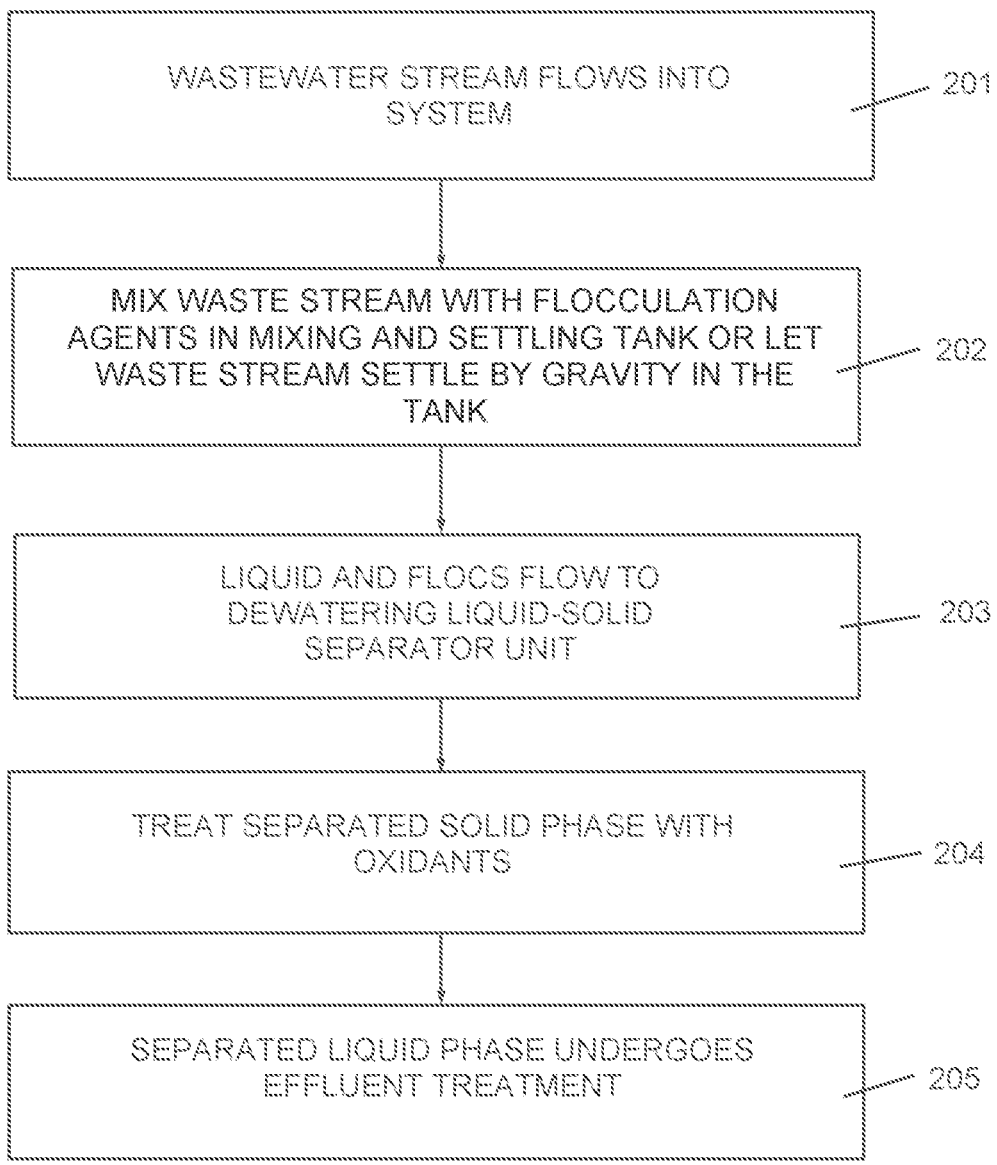
FIG. 2 is a flow chart of an organic waste treatment process in accordance with a non-limiting embodiment of the present invention.

Reference is now made to FIG. 2, which illustrates an organic waste treatment process in accordance with a non-limiting embodiment of the present invention. The process may be carried out in a portable or non-portable system.

In step 201, a wastewater stream flows into the system. The waste may be, without limitation, from animal processing or animal feeding separation, such as bovine farms, dairy farms, chicken farms, swine farms, equine ranches and others, manure from lagoons, human waste and many more. Waste may be transported by regular pipes, pumps or other suitable techniques. Another example is sewage or septic truck, which in accordance with the invention, can transport collected waste to the system (which may be located in a municipality, for example). The system may include a buffer tank for temporarily storing waste from more than one such truck before the waste goes to a settling tank in the process described below.

In step 202, the waste stream flows to a mixing and settling tank, where it is mixed with flocculation agents, such as but not limited to, polymer (e.g., polyelectrolyte, cationic or anionic). A non-limiting example used in experiments is ALSTAFLOC 155, a high molecular weight cationic polyelectrolyte powder from Chemtex. The solid waste particles, such as colloids, are dispersed or suspended in the waste stream, and due to flocculation they form larger-size clusters or flocs which settle at the bottom of the tank as sedimentation. Alternatively, the waste particles in the stream may simply settle by gravity in the settling tank without the help of flocculation agents.

In step 203, the liquid and flocs flow to a dewatering liquid-solid separator unit. There are many dewatering liquid-solid separator units, commercially available from many companies and well known in the art.

As is known, sludge dewatering is the separation of a liquid and solid phase whereby, generally, the least possible residual moisture is required in the solid phase and the lowest possible solid particle residues are required in the separated liquid phase (in centrifugal units, this is called the centrate).

In step 204, the separated solid phase is treated with oxidants, such as in accordance with the system and method of U.S. Pat. No. 9,936,842. Solid phase oxidizing treatment can take place at the same location where the separation took place or in a different geographic location. In such a system, the separated solid phase of the organic waste is treated by an oxidizing agent to reduce its water content which may involve an exothermic reaction, thereby to reduce bad odor, microbial contamination, parasites and infectious disease.

The oxidizing agent may be, without limitation, potassium permanganate or any other oxidizing agent, and it is mixed with the organic waste in a reactor to initiate an oxidizing reaction in which the water content is lowered and the organic matter is oxidized. What remains is sterile odorless ash with significant lower water content. This ash can be used as a fertilizer or as a source of minerals for the chemical industry.

In step 205, the separated liquid phase (e.g., centrate) may undergo effluent treatment with any known effluent treatment process in order to bring the reclaimed water to a desired quality according to regulations and needs. The solid by-products of the effluent treatment may be directed to the solid processing unit of step 204 to reduce waste and increase efficiency of the overall system.

Accordingly, the present invention eliminates the expensive and time-consuming step of anaerobic or aerobic decomposition. The waste is treated by flocculation, and after forming flocs in a liquid, separated to a liquid phase and a solid phase; the solid phase is then treated with oxidants. The products of oxidation are recovered for agricultural or industrial use, unlike the prior art decomposition by-products which go to waste.

What is claimed is:

1. A method of organic waste treatment comprising:
    treating an organic waste stream that contains solid waste particles suspended in a liquid to cause the solid waste particles to settle in a settling tank;
    separating contents of said tank into a separated liquid phase and a separated solid phase; and
    treating said separated solid phase with an oxidant to create a sterile odorless ash by mixing said oxidant with said separated solid phase in a reactor to cause an oxidizing reaction in which water content of said separated solid phase is lowered and organic matter of said separated solid phase is oxidized into a sterile odorless ash with a lower water content; and
    wherein the contents of said tank with flocculation agents to form flocs that settle in the settling tank
    wherein said organic waste stream is provided from animal or human waste and the method does not cause anaerobic or aerobic decomposition of the animal or human waste.

2. The method according to claim 1, wherein the step of treating comprises using gravity to cause the solid waste particles to settle in the settling tank.

3. The method according to claim 1, wherein the step of separating comprises sludge dewatering.

4. The method according to claim 1, comprising treating said separated liquid phase in an effluent treatment process to reclaim usable water from said separated liquid phase.

5. The method according to claim 1, comprising using said sterile odorless ash for agricultural or industrial use.

\* \* \* \* \*